United States Patent [19]

Baisden

[11] 4,426,782

[45] Jan. 24, 1984

[54] ATTACHMENT FOR A BACKHOE ARM

[76] Inventor: Jerry Baisden, 2758 Merritt St., Springfield, Ohio 45503

[21] Appl. No.: 397,639

[22] Filed: Jul. 12, 1982

[51] Int. Cl.[3] .......................... B27L 7/00; B23D 45/20

[52] U.S. Cl. ...................................... 30/379.5; 30/123; 83/605; 144/193 A; 144/366

[58] Field of Search .......................... 83/599, 605–609, 83/928; 30/379, 379.5, 123, 124, 228; 144/193 R, 193 A, 193 K, 3 R, 366

[56] References Cited

U.S. PATENT DOCUMENTS

| | | | |
|---|---|---|---|
| 3,780,779 | 12/1973 | Guy | 144/193 A |
| 4,073,325 | 2/1978 | Krom, Jr. | 144/193 A |
| 4,236,556 | 12/1980 | Smith | 144/193 A |
| 4,240,476 | 12/1980 | Rattray | 144/193 A |
| 4,261,400 | 4/1981 | Spence | 144/193 A |
| 4,341,246 | 7/1982 | Salladay | 144/193 R |
| 4,374,532 | 2/1983 | Region | 144/193 A |
| 4,376,340 | 3/1983 | Ramun | 30/228 |

*Primary Examiner*—W. D. Bray
*Attorney, Agent, or Firm*—Biebel, French & Nauman

[57] ABSTRACT

An attachment is provided for selectively operating one of a variety of tools for removable attachment to the arm of a backhoe machine from which the bucket has been removed. One of the tools may have a first portion movable with respect to a second portion. Each of the tools are mounted to a rigid bar, any one of which is alternatively insertable into one end of a frame fittable on the backhoe arm. The backhoe includes a hydraulic cylinder disposed along the arm for pivoting the bucket when attached, and the attachment is provided with a sliding member connectable with the end of the cylinder for movement thereby along the attachment frame. A guide member directs the sliding member along the length of the frame. A lever is pivotally attachable at one end to a movable portion of the movable tool, and is pivotally attachable at an opposite end to the sliding member when the tool is secured in place along the frame.

9 Claims, 4 Drawing Figures

ATTACHMENT FOR A BACKHOE ARM

BACKGROUND OF THE INVENTION

The present invention relates to an attachment for use with the arm of a conventional backhoe machine and, more particularly, to such an attachment with which a number of different operations may be performed.

The splitting of logs is a long and laborious task, particularly when done manually. Accordingly, it is known that this task may be facilitated by using an apparatus designed to cooperate with a hydraulic cylinder, where the cylinder operates either to push a splitting wedge through the log, or to push the log against a wedge. Several of such known devices are designed to be used as attachments to tractors fitted with such a cylinder. In U.S. Pat. No. 3,780,779, issued Dec. 25, 1973, to Guy, such a device is disclosed for use on a front-loading tractor. The attachment includes a frame which is connected to the tractor near the point at which the front loader arm is mounted to the tractor body, and a wedge is mounted to the frame adjacent its outer end. One of the hydraulic cylinders, normally used for manipulating the tractor bucket, is secured to the frame so as to direct its path of travel along the frame. A log to be split is placed between the piston end and the wedge, and the piston urges the log against the wedge, causing it to split.

In U.S. Pat. No. 4,073,325, issued Feb. 14, 1978, to Krom, a wood-splitting attachment is disclosed for use with the arm of a backhoe machine. A trough-like member is attached at the end of the backhoe arm, and a plate is mounted across the outer end of the trough. A bracket is provided at the inner end of the trough for directing the cylinder rod along the trough. A wedge member is provided for attachment to the outer end of the rod, and a log to be split is placed in the trough abutting the end plate. The cylinder then drives the wedge member through the log, causing it to split.

While such devices are generally effective in splitting wood, they are inherently dedicated to that function alone. There are, however, a number of other operations, laborious when performed manually, that may be facilitated through use of a hydraulic cylinder.

One example of such an operation is the cutting of pipe, particularly brittle pipe constructed of a clay or cast iron material. The typical device for cutting such pipe includes a first and second portion pivotally joined so that the ends of each of the portions may be pivotally moved closer together or further apart. A length of chain is connected from the end of one portion to the end of the other portion and is extended around the exterior of the pipe to be cut, so as to encircle the pipe firmly. The portions are pivoted, drawing their ends together, which has the effect of shrinking the diameter of the circle defined by the chain extended about the pipe. The chain then quickly and accurately causes the pipe to snap in two. Such devices are available for manual operation, but are practical for use only with pipe of relatively small diameter. Other versions are available for hydraulic operation, and include their own hydraulic cylinder as a portion of the machine.

Similarly, a cutter for cutting metallic rods includes a base portion with a second portion pivotally mounted thereto. Wedge-shaped cutting edges are provided along both of the portions to form jaws, and pivoting of the second portion about the base portion causes the blades to be drawn into contact. A rod to be cut is placed into the jaws between the edges, the portions are pivoted, and the rod is cut. As with the pipe cutter, manual operation of such a tool is practical only for rod of relatively small size. Such an operation, however, is easily adaptable to performance by a hydraulic cylinder.

As indicated, power tools for performing such operations are generally available, but such tools typically provide their own hydraulic system for operation of the tools, with the resulting high cost and complexity.

Alternatively, in either of the examples cited above, appropriate attachments could be used to take advantage of the hydraulic cylinder readily available with a conventional backhoe tractor. Separate attachments, however, would require the purchase of an attachment for each operation that is contemplated, with the resultant increase in cost. Additionally, an attachment must be dismounted and a new one attached whenever it is desired to change operations.

What is needed, therefore, is a single attachment for use with a backhoe that is readily adaptable for performing many different operations. Such an attachment should be quick and simple to mount to the tractor, and should require simple modification for adaptation from one operation to the next.

SUMMARY OF THE INVENTION

The present invention provides an attachment for removable attachment to the arm of a conventional backhoe machine from which the bucket has been removed, the backhoe having a cylinder disposed along the arm for pivoting the bucket when in place on the arm. The attachment is used for selectively operating a variety of different tools, with at least one tool being operable by moving a first tool portion with respect to a second tool portion.

A bar is mounted to one portion of each of the tools. The attachment includes a frame having a first end and a second end fittable on the backhoe arm at its outer end, the second end defining the outer end of the frame when in place on the arm. The frame is fastened to the arm, and includes an opening substantially at its second end for insertion of one of the bars thereinto. The bar is then secured within the opening. A sliding member is connectable with the end of the backhoe cylinder for movement thereby along the frame. A guide means directs the sliding member along the frame between the first end and the second end. The sliding member is operatively connectable to move the first portion of the movable tool with the sliding member when the movable tool is secured to the frame.

The connection between the sliding member and first movable tool portion may be by a lever pivotally attachable at one end to the first tool portion, and pivotally attached at its opposite end to the sliding member when the tool is mounted to the frame.

The guide means may include a guide member mounted along at least a portion of the frame between the first end and second end, the guide member having a top and two opposing sides. At least one side defines a flange running along its length, and the sliding member has a groove cooperating with the flange for directing the sliding member along the guide member. The sliding member itself includes a support portion adapted for cooperation with the guide means for movement along the frame. A plate member having a substantially flat surface is mounted to the support portion such that the flat surface is disposed substantially perpendicular to the direction of movement of the support portion along the frame.

The means for pivotally attaching the lever to the sliding member may include a slot defined in the plate member of the sliding member for insertion of the lever through the slot.

Accordingly, it is an object of the present invention to provide an attachment for selectively operating one of a variety of tools, the attachment being for removable attachment to the arm of a backhoe machine from which the bucket has been removed; to provide such an attachment that is relatively quick and simple to mount to the backhoe arm; to provide such an attachment that may be modified for differing operations, the modifications being relatively quick and simple to perform; to provide such an attachment whereby the various operations may be easily carried out; and to provide such an attachment that is relatively simple and inexpensive to construct.

Other objects and advantages will be apparent from the following description, the accompanying drawings and the appended claims.

DETAILED DESCRIPTION OF THE PREFERRED EMBODIMENT

Figures 1, 2, 3:
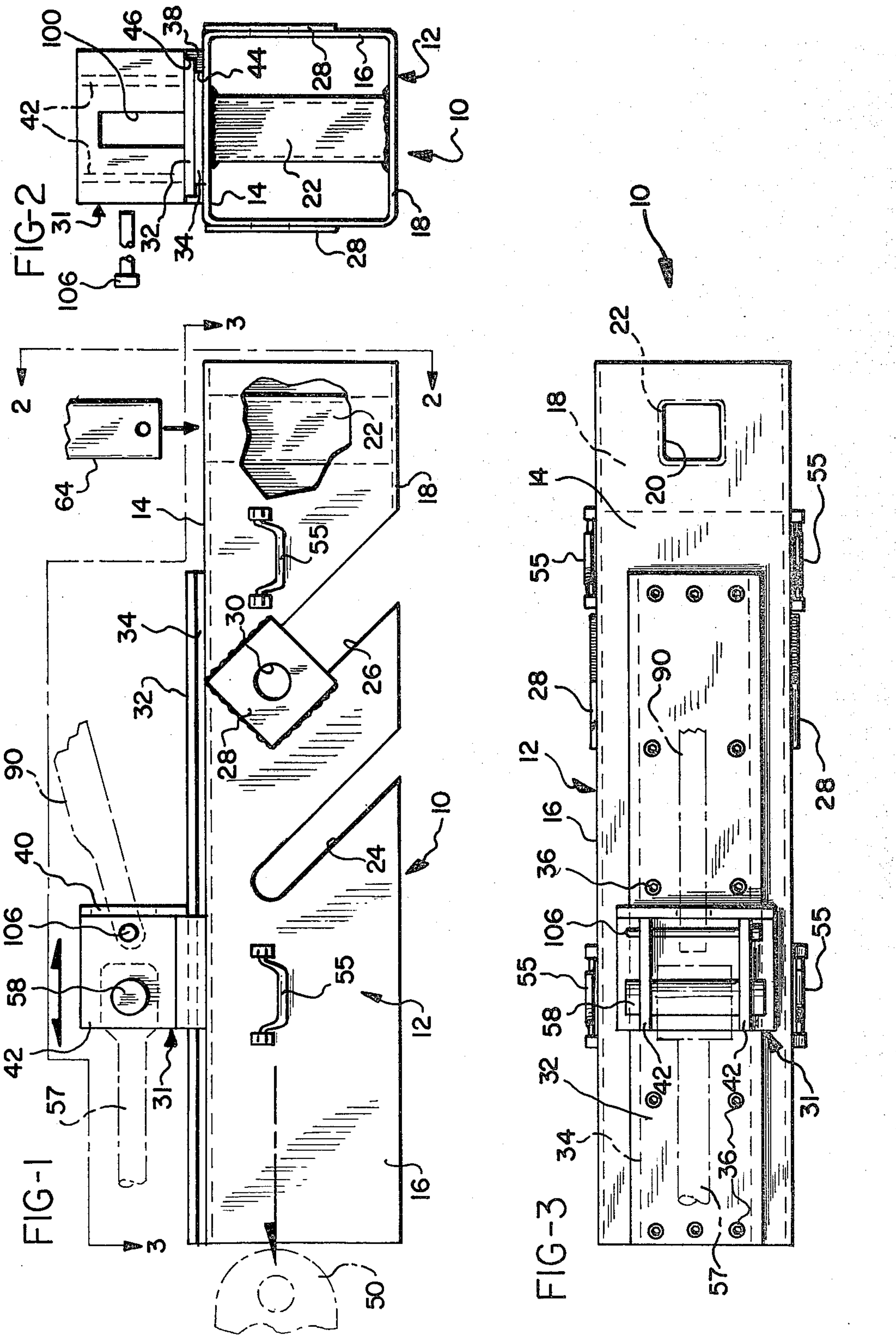
FIG. 1 is a side elevational view showing the attachment of the present invention.
FIG. 2 is a end view of the attachment taken generally along line 2—2 of FIG. 1.
FIG. 3 is a top plan view taken generally along line 3—3 of FIG. 1.

Referring generally to the drawings and, in particular, to FIGS. 1, 2 and 3, an attachment 10 for removable attachment to the arm of a backhoe machine includes a frame 12 having a base 14 and a pair of attached side members 16. Frame 12 is preferably constructed from a length of steel square tube stock, from which all but a portion of one side of the tube is cut. The shortened side forms a bottom member 18 connected between side members 16 at one end of frame 12.

An opening 20 is defined in base 14, with a similar opening defined through bottom member 18. A length of square tube stock 22 is connected between the openings 20.

Each side member 16 of frame 12 includes a pair of slots 24 and 26 extending in a diagonal fashion from the bottom edge of side member 16 partially across the height of side member 16. A plate 28 having a hole 30 defined therethrough is mounted over the closed end of slot 26.

A sliding member 31 is directed by a guide means is mounted along the base 14 of frame 12. The guide means includes a guide member 32, and a spacer 34 disposed between guide member 32 and base 14. Guide member 32 and spacer 34 are secured to base 14 by a plurality of bolts 36 extending through guide member 32 and spacer 34 into base 14.

Sliding member 31 includes support portion 38 provided for movement along guide member 32 and for maintaining a plate member 40 in an orientation perpendicular to base 14. Plate member 40 is mounted to support portion 38, further supported by a pair of side plates 42 also mounted to support portion 38. Support portion 38 further includes an opening 44 defined along the bottom thereof, with a groove 46 extending along each wall of the opening 44. Opening 44 and grooves 46 are sized so as to cooperate with guide member 32 and spacer 34 such that sliding member 31 may be directed along the length of base 14 of frame 12.

Figure 4:
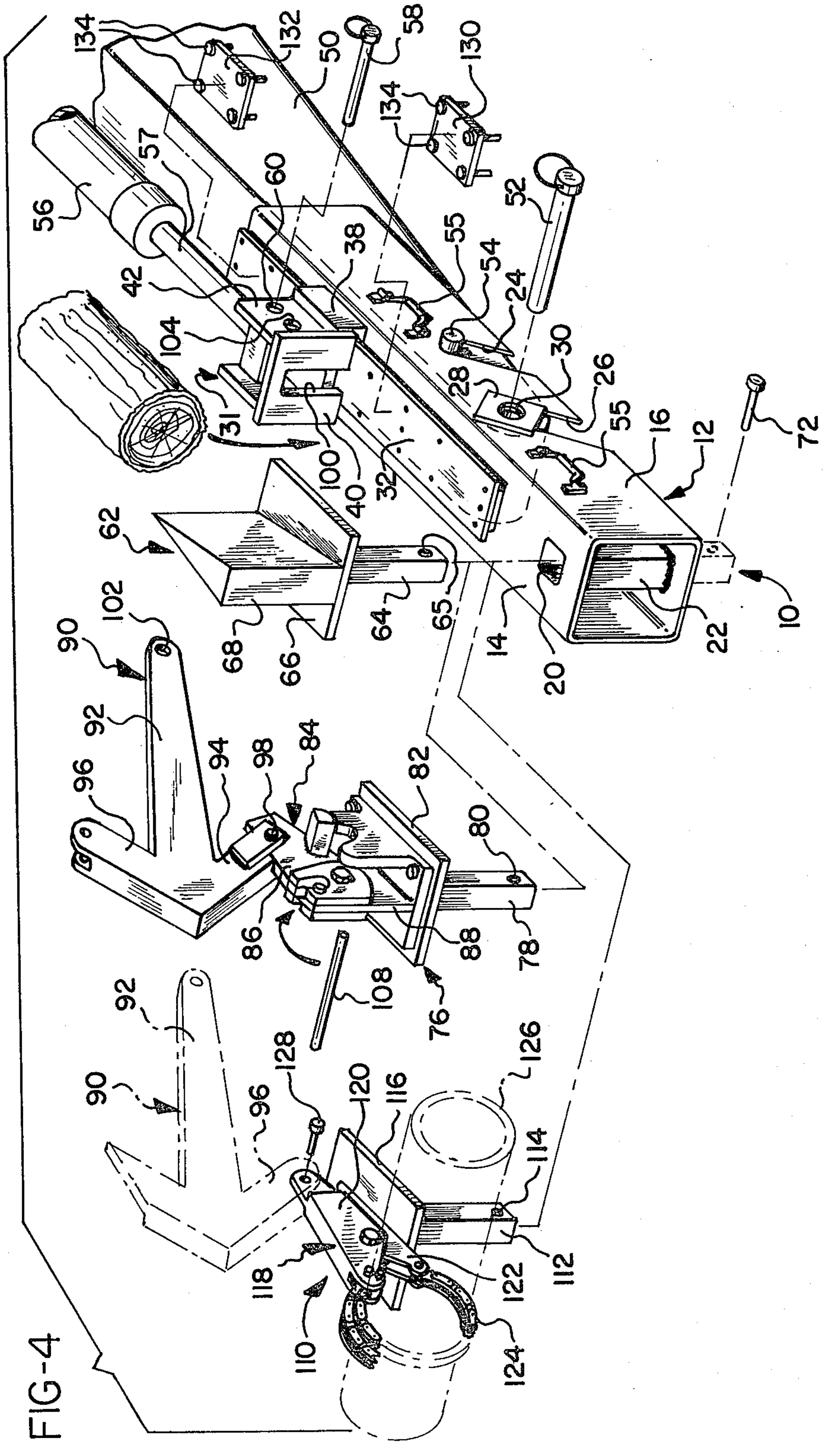
FIG. 4 is a perspective view showing the alternative mounting of several tools to the attachment.

The construction of the attachment 10 will be better appreciated by consideration of the mounting of the attachment 10 to the arm of a backhoe machine, as shown in FIG. 4. A typical arm 50 from which the backhoe bucket has been removed includes a pair of holes passing through arm 50 into which removable pins 52 and 54 are insertable. To mount the attachment 10 to the arm 50, the pin 54 is inserted or left in place in the arm 50, and the frame 12 is placed onto arm 50 such that pin 54 enters and moves to the end of each slot 24 of the side members 16. It will be seen that frame 12 is pivotable about pin 54, and thus frame 12 may be mounted from a number of initial orientations of frame 12, thereby facilitating its mounting upon arm 50. Once frame 12 has been moved into proper position, i.e., with base 14 parallel to the upper surface of arm 50, holes 30 of the side plates 28 on each side member 16 will align with the hole in arm 50 provided for pin 52. Pin 52 may then be inserted, securing frame 12 into position.

To facilitate placing and positioning of the frame 12 on arm 50, as well as movement of attachment 10 when not in use, a pair of fold-down handles 55 are mounted to each of the side members 16.

The backhoe machine further includes a hydraulic cylinder 56 having a rod 57 extendable and retractable along arm 50, provided for pivoting of the backhoe bucket when mounted to the end of arm 50. A hole is provided through a knuckle at the end of rod 57, through which a removable pin 58 is insertable, normally used for securing the rod 57 to the bucket. Once frame 12 is securely in place upon arm 50, the end of rod 57 is placed between the side plates 42 carried by the support portion 38. A hole 60 is provided in each of the side plates 42, disposed so as to cooperate with the hole in the end knuckle of rod 57 for insertion of pin 58 thereinto. The connection of rod 57 to support portion 38 enables extension and retraction of the cylinder 56 by the backhoe operator to move sliding member 31 in either direction along guide member 32.

Operation of the attachment 10 for splitting wood requires the mounting of wedge tool insert 62 to the frame 12. A length of square rods 64 having a hole 65 near one end is mounted at the other end to a plate 66, to which a wedge 68 is attached. As indicated by FIG. 4, wedge tool insert 62 is mounted to frame 12 by inserting bar 64 into opening 20 of frame 12, through tube 22. Once in place, a pin 72 is inserted through hole 65, thereby securing the wedge tool insert 62 in place such that the leading edge of wedge 68 is directed towards sliding member 31.

To operate the attachment 10 for splitting wood, a log 74 or other piece of wood is placed onto attachment 10 along guide member 32. The backhoe operation causes the rod 57 to extend, thereby moving sliding member 31 and thus plate member 40 along guide member 32. The plate member 40 pushes log 74 into contact with wedge 68 of wedge insert 62. Further force applied to log 74 by plate member 40 causes the log 74 to move into wedge 68, thereby splitting the log 74.

The attachment 10 may be further used in conjuction with rod-cutting tool insert 76 for cutting metal rod such as reinforcing rod or the like. A square bar 78, having a hole 80 defined in one end thereof, it attached to a plate 82. A rod-cutting tool 84 is attached to plate 82, and may be any commercially available rod-cutting tool having a first portion 86 that is pivotable about a fixed second portion 88 to close and open jaws having cutting edges defined therealong.

The attachment 10 further includes a lever 90 having a body 92 and a pair of arms 94 and 96 attached thereto. A hole is provided at the outer end of arm 94, cooperating with a hole provided in the first tool portion 84 for insertion of a pin 98 whereby lever 90 is secured to the tool 84.

Plate member 40 further includes a slot 100 disposed between side plates 42. When rod cutting insert 76 is to be mounted to the attachment 10, bar 78 is inserted through opening 20 in frame 12, and the body 92 of lever 90 is inserted through slot 100 in plate membver 40. Body 92 includes a hole 102 disposed at the end thereof, and each side plate 42 includes a hole 104 cooperating with hole 102 for insertion of a pin 106 thereinto, pivotally securing lever 90 to sliding member 31.

To use the attachment 10 for cutting rods with the rod cutting insert 76 in place on frame 12, a rod 108 is inserted into the jaws of the tool 84. The backhoe operator extends the hydraulic cylinder 56, which moves the sliding member 31, thereby moving the lever 90. Lever 90 in turn pivots the first tool portion 86 about the second tool portion 88, cutting the rod 108. Retraction of cylinder 56 then causes lever 90 to be moved in the opposite direction, pivoting first tool portion 86, opening and readying the tool 84 for cutting a subsequent rod.

Similarly, a pipe-cutting tool insert 110 includes a bar 112 having a hole 114 in one end thereof. A plate 116 is mounted to the opposite end of bar 112, to which is mounted a commercially available chain pipe-cutting tool 118. Tool 118 includes a first tool portion 120 pivotally attached to a second tool portion 122. A length of chain 124 is permanently attached to second tool portion 122, and may be extended about a length of clay or iron pipe 126 which is to be cut. Chain 124 is then attached to the first tool portion 118 as indicated by FIG. 4, and the first tool portion 118 is pivoted about second tool portion 120 so as to contract chain 124 about pipe 126, causing the pipe to be evenly cut in two.

First tool portion 118 includes a hole near one end thereof communicating with a hole at the outer end of arm 96 of lever 90. A pin 128 is insertable through the holes, pivotally securing lever 90 to pipe cutting tool 118. Pipe cutting insert 110 is mounted to frame 12 in a manner similar to that of inserts 76 and 62. Body 92 of lever 90 is inserted through slot 100 of plate member 40, secured in place by pin 106. The attachment 10 may be operated to cut pipe by extending and retracting hydraulic cylinder 56, which causes the first tool portion 120 to be pivoted about the second tool portion 122 in either direction as described.

It will be recognized that the use of two different arms 94 and 96 on lever 90, one each for use with either tool 84 or tool 118, may not be necessary, depending upon the specific dimensions of the tools used, in which case a lever with a single arm would be sufficient. Moreover, the exact configuration of the tool insert can be designed, such as by providing in insert 110 a spacer block between plate 116 and tool 118, for example, to permit use of a lever having a single arm.

As seen in FIG. 4, a pair of stop members 130 and 132 may be mounted to the attachment 10, disposed along guide member 32 and secured in place by a plurality of bolts 134. Stop members 130 and 132 are provided for use when tools requiring lever 90 are mounted to frame 12, and permit movement of lever 90 through the smallest distance possible to operate the tool. Thus, operation of the tool may be made quickly, with inherent precision in the positioning of lever 90.

It can easily be seen that a variety of tools other than the rod-cutting tool 84 and the pipe-cutting tool 118 disclosed herein may be used with the attachment 10. Moreover, mounting of the various tools to the attachment 10 is not restricted to insertion of the bar through tube 22 from the top of the frame 12. For example, a scarifier tool insert (not shown) for ripping pavement or other hard surfaces with a plurality of teeth may be provided. In such a case, the scarifier teeth are disposed to depend downwardly from a mounting frame or bracket, to which in turn is mounted a rigid bar similar to bars 64, 78, or 112. The insert is mounted to the attachment 10 by inserting the bar through tube 22 from the bottom; i.e., by passing the bar through bottom member 18 first. The insert is secured by inserting a pin through a hole in the bar located just above base 14 when the scarifier tool is in place on attachment 10.

It should also be recognized from the foregoing discussion that the use of the attachment 10 is not restricted to tools requiring the cylinder 56 for the operation thereof. Thus, the present invention encompasses use of the attachment 10 with any tool which may be removably mounted to frame 12 and operated either by manipulation of the backhoe arm 50 or cylinder 56, or both.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. An attachment for selective mounting and operating one of a variety of tools, at least one of the selectable tools being movably operable by movement of a first tool portion with respect to a second tool portion by a lever detachably connected to the first tool portion, each of the tools having a rigid bar mounted thereto, said attachment being for removable attachment to the arm of a backhoe machine from which the bucket has been removed, the backhoe further having a hydraulic cylinder disposed along the arm normally for pivoting the bucket when in place on the arm, said attachment comprising:

a frame fittable on the backhoe arm at its outer end having a first end and a second end, said second end defining the outer end of said frame when in place on the arm;

means for fastening said frame to the arm;

said frame having an opening therein substantially at said second end for insertion of one of the bars thereinto, thereby mounting a selected one of the tools to said frame;

means for retaining the bar within said opening;

a sliding member connectable with the end of the cylinder for movement thereby along said frame;

guide means for directing said sliding member along said frame between said first end and said second end; and means for selectively coupling the lever to said sliding member for movement of the lever by movement of said sliding member when the movably operable tool is selectively mounted to said frame.

2. An attachment for selectively mounting and operating one of a variety of tools, at least one of the selectable tools being movably operable by movement of a first tool portion with respect to a second tool portion, each of the tools having a rigid bar mounted thereto, said attachment being for removable attachment to the arm of a backhoe machine from which the bucket has been removed, the backhoe further having a hydraulic cylinder disposed along the arm normally for pivoting the bucket when in place on the arm, said attachment comprising:

a frame fittable on the backhoe arm at its outer end having a first end and a second end, said second end defining the outer end of said frame when in place on the arm;

means for fastening said frame to the arm;

said frame having an opening therein substantially at said second end for insertion of one of the bars thereinto, thereby mounting a selected one of the tools to said frame;

means for retaining the bar within said opening;

a sliding member connectable with the end of the cylinder for movement thereby along said frame;

guide means for directing sad sliding member along said frame between said first end and said second end; and means operatively connectable to said sliding member for moving the first portion of the movably operable tool with said sliding member when the tool is selectively mounted to said frame.

3. An attachment as defined in claim 2 wherein said means operatively connectable to said sliding member includes a lever pivotally attachable at one end to the first tool portion, and a means for pivotally attaching an opposite end of said lever to said sliding member.

4. The attachment as defined in claim 2 wherein said frame includes a base and a pair of side members, said side members being attached to said base substantially along the opposite side edges thereof.

5. The attachment as defined in claim 4 wherein the arm includes two holes extending therethrough, and said means for fastening said frame to the arm includes two openings defined in each of said side members, each of said openings cooperating with one of said holes, and two pins, each pin being insertable through and extending from one of said openings of each said side member and one of said holes.

6. The attachment as defined in claim 4 wherein said frame further includes a bottom member attached to and extending between and partially along the edges of each of said members remote from said base substantially at said second end of said frame, said opening in said frame for insertion of said bar being defined through both said base and said bottom member, and wherein said means for retaining said bar within said opening includes a hole defined through said bar, said hole being substantially adjacent said bottom member when said bar is inserted into said opening, and a pin insertable into said hole.

7. The attachment as defined in claim 2 wherein said guide means includes a guide member mounted along at least a portion of said frame between said first end and said second end, said guide member having a top and two opposing sides, at least one of said sides defining a flange along the length of said guide member, said sliding member having a groove cooperating with each of said flanges for directing said sliding member along said guide member.

8. The attachment as defined in claim 2 wherein said sliding member includes a support portion adapted for cooperation with said guide means for movement along said frame, and a plate member having a substantially flat surface mounted to said support portion such that said flat surface is disposed substantially perpendicular to the direction of movement of said support portion along said frame.

9. The attachment as defined in claim 8 wherein said means for pivotally attaching said lever to said sliding member includes a slot defined in said plate member for insertion of said lever therethrough.

* * * * *

UNITED STATES PATENT AND TRADEMARK OFFICE

CERTIFICATE OF CORRECTION

PATENT NO. : 4,426,782

DATED : January 24, 1984

INVENTOR(S) : Jerry Baisden

It is certified that error appears in the above-identified patent and that said Letters Patent are hereby corrected as shown below:

Col. 3, line 56, delete "is" before "directed".
Col. 4, line 66, correct the spelling of "conjunction".
Col. 5, line 1, change "it" to -- is --.

Col. 8, line 12, insert -- side -- before "members".

Signed and Sealed this

*Twenty-fourth* Day of *July 1984*

[SEAL]

*Attest:*

GERALD J. MOSSINGHOFF

*Attesting Officer* *Commissioner of Patents and Trademarks*